United States Patent

Pham Van et al.

(10) Patent No.: US 12,219,642 B2
(45) Date of Patent: Feb. 4, 2025

(54) METHODS FOR HANDLING CONTEXT INFORMATION FOR MOBILE-TERMINATED EARLY DATA TRANSMISSION

(71) Applicant: TELEFONAKTIEBOLAGET LM ERICSSON (PUBL), Stockholm (SE)

(72) Inventors: Dung Pham Van, Taby (SE); Paul Schliwa-Bertling, Ljungsbro (SE); Magnus Stattin, Upplands Vasby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 644 days.

(21) Appl. No.: 17/431,293

(22) PCT Filed: Feb. 13, 2020

(86) PCT No.: PCT/IB2020/051216
§ 371 (c)(1),
(2) Date: Aug. 16, 2021

(87) PCT Pub. No.: WO2020/165843
PCT Pub. Date: Aug. 20, 2020

(65) Prior Publication Data
US 2022/0132616 A1    Apr. 28, 2022

Related U.S. Application Data

(60) Provisional application No. 62/805,430, filed on Feb. 14, 2019.

(51) Int. Cl.
*H04W 76/19* (2018.01)
*H04W 68/00* (2009.01)
*H04W 74/0833* (2024.01)

(52) U.S. Cl.
CPC ........ *H04W 76/19* (2018.02); *H04W 68/005* (2013.01); *H04W 74/0833* (2013.01)

(58) Field of Classification Search
CPC ............... H04W 76/19; H04W 68/005; H04W 74/0833; H04W 76/25; H04W 68/00
See application file for complete search history.

(56) References Cited

U.S. PATENT DOCUMENTS

2015/0156122 A1*  6/2015  Singh ............... H04L 43/08
                                                370/235
2016/0095004 A1*  3/2016  Tseng ............... H04W 76/16
                                                370/329

(Continued)

FOREIGN PATENT DOCUMENTS

GB          2548878 A   * 10/2017   ........ H04W 36/0033
WO    WO-2017085621 A1 *  5/2017   ......... H04L 63/0807

OTHER PUBLICATIONS

Huber, Oliver, "International Search Report"; EPO, HV Rijswijk, NL, Apr. 1, 2020.

(Continued)

*Primary Examiner* — Habte Mered
(74) *Attorney, Agent, or Firm* — Sage Patent Group

(57) ABSTRACT

A method in a target network node and a corresponding network node, for performing secure Mobile Terminated (MT) early data transmission (EDT) is provided. The method may comprise: sending a paging message to the wireless device, which has been suspended from a connection with a second network node, the paging message comprising an early data transmission (EDT) indication; receiving a random access preamble from the wireless device; obtaining context information of the wireless device; and resuming a data connection with the wireless device based on the context information.

20 Claims, 10 Drawing Sheets

Receiving one of an identifier related to a wireless device and context information of the wireless device, after the wireless device has been suspended from a second network node
610

Sending one of the identifier and context information to a third network node, with which the wireless device is resuming the connection
620

(56) References Cited

U.S. PATENT DOCUMENTS

2019/0104553 A1 4/2019 Mikael et al.
2019/0342800 A1* 11/2019 Sirotkin ............... H04B 17/318
2020/0323010 A1* 10/2020 Sivavakeesar .......... H04W 4/70
2021/0076306 A1* 3/2021 Tamura ................... H04W 8/24

OTHER PUBLICATIONS

Ericsson: "Mobile-terminated early data transmission 11", 3GPP Draft; R2-1814340—Mobile-Terminated Early Data Transmission, 3rd Generation Partnership Project, (3GPP), Mobile Competence Centre, 650, Route Deslucioles, F-06921 Sophia-Antipolis Cedex, FR-vol. RAN WG2, No. Chengdu, P. R. China; Oct. 8, 2018-Oct. 12, 2018 Sep. 28, 2018 (Sep. 28, 2018), XP051523783.
Qualcomm Incorporated: "M1-initiated EDT", 3GPP Draft; R2-1814037 MT EDT, 3rd Generation Partnership Project (3GPP), Mobile Competence Centre; 650, Route Des Lucioles; F-06921 Sophia-Antipolis Cedex; France, vol. RAN WG2, No. Chengdu, China; Oct. 8, 2018-Oct. 12, 2018, Sep. 28, 2018 (Sep. 28, 2018), XP051523498.
Mediatek Inc: "Mobile-terminated Early Data Transmission"; 3GPP Draft; R2-1815372, 3rd Generation Partnership Project (3GPP), Mobile Competence Centre; 650, Route Des Lucioles; F-06921 Sophia-Antipolis Cedex; France, vol. RAN WG2, No. Chengdu, China; Oct. 8, 2018-Oct. 12, 2018; Sep. 28, 2018 (Sep. 28, 2018), XP051524721.

* cited by examiner

METHODS FOR HANDLING CONTEXT INFORMATION FOR MOBILE-TERMINATED EARLY DATA TRANSMISSION

RELATED APPLICATIONS

The present application claims the benefits of priority of U.S. Provisional Patent Application No. 62/805430, entitled "UE context handling for early transmission of mobile-terminated data" and filed at the United States Patent and Trademark Office on Feb. 14, 2019, the content of which is incorporated herein by reference.

TECHNICAL FIELD

The present description generally relates to wireless communication systems and more specifically to handling User Equipment (UE) context for early transmission of mobile-terminated data.

BACKGROUND

There has been a lot of work in third Generation Partnership Project (3GPP) lately on specifying technologies to cover Machine-to-Machine (M2M) and/or Internet of Things (IoT) related use cases. Most recent work for 3GPP Releases 13 and 14 includes enhancements to support Machine-Type Communications (MTC) with new UE categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

The Long Term Evolution (LTE) enhancements introduced in 3GPP Releases 13, 14, and 15 for MTC are referred to as "eMTC", including (but not limited to) support for bandwidth limited UEs, Cat-M1, and support for coverage enhancements. This is to separate discussions from NB-IoT (notation here used for any Release (Rel.)), although the supported features are similar on a general level.

In this disclosure, the messages in the Random Access (RA) procedure are commonly referred to as message 1 (Msg1) through message 4 (Msg4). From 3GPP TS 36.300, the contention-based RA procedure is illustrated in FIG. 1.

For both eMTC and NB-IoT, 'Cellular IoT (CIoT) Evolved Packet System (EPS) User Plane (UP) optimization' and 'CIoT EPS Control Plane (CP) optimization' signaling reductions were also introduced in Rel-13. The former, herein referred to as the UP-solution, allows the UE to resume a previously stored Radio Resource Control (RRC) connection (thus also known as RRC Suspend/Resume). The latter, herein referred to as the CP-solution, allows the transmission of user-plane data over Non-Access Stratum (NAS) signaling, and is also referred to as "Data over NAS" (DoNAS).

In 3GPP Rel-15, the work items (WIs) "Even further enhanced MTC for LTE (LTE_eMTC4)" [WI_eMTC] and "Further NB-IoT enhancements (NB_IOTenh2)" [WI_NBIOT] target eMTC and NB-IoT enhancements were introduced. The common objective of these WIs is to reduce UE power consumption and latency through introducing possibilities to send data as early as possible during the Random Access (RA) procedure, or commonly referred to as early data transmission (EDT).

EDT has been extensively discussed from RAN2 #99. Since then, it was agreed to support transmission of data in Msg3 only, or in Msg4 only, or in both Msg3 and Msg4 depending on actual use cases for both Rel-13 UP and CP solutions. However, in Rel-15, only the EDT solutions for mobile-originated (MO) calls are specified. In MO EDT solutions, the UE with small UpLink (UL) user data can indicate its intention of using EDT, i.e., sending UL user data in Msg3 by selecting an EDT preamble in Msg1. The base station (e.g. eNB) provides the UE with an EDT UL grant in Msg2 that allows the UE to transmit UL data together with signaling in Msg3. Depending on UL data condition, the UE can select a suitable (possible smallest) value of transport block size (TBS) among the possible values specified based on the maximum TBS value and the permitted number of blind decodes (i.e., number of TBS values smaller than the maximum value) informed by the eNB via system information. DL data (if any) can be included in Msg4 together with signaling that indicates the UE to return to RRC IDLE mode for power saving improvements if no more data transmission is expected. But if there are more user data, the network can, in Msg4, indicate the UE to move to RRC_CONNECTED mode, i.e., establishing or resuming the RRC connection as in legacy for further data transmissions.

In the Rel-16, Work Item Descriptions (WIDs) for both eMTC and NB-IoT, one of the objectives is to specify support for Mobile-Terminated (MT) EDT.

For example, the objective is to specify the following set of improvements for machine-type communications for Bandwidth reduced Low complexity (BL)/Coverage Enhancement (CE) UEs and NB-IoT Frequency Division Duplex (FDD):
Improved DownLink (DL) transmission efficiency and/or UE power consumption:
   i. Specify support for mobile-terminated (MT) early data transmission (EDT) [RAN2, RAN3]
MT EDT was discussed in recent RAN2 #103bis and RAN2 #104 meetings with the following agreements:
   i. RAN2 intends to support MT-initiated EDT for both CP and UP solutions.
   ii. The intention to use MT-EDT is for user data, i.e. not for Non-Access Stratum (NAS) signaling.
   iii. MT EDT is evaluated at least based on battery life, network resource efficiency, security, reliability and potential impact on core network.
   iv. MT EDT is intended for DL data which can be transmitted in one transport block.
   v. Use cases that require DL data transmission with or without UL data transmission as a response should be supported for MT-EDT.

An email discussion, [104 #49][eMTC & NB-IoT R16] MT EDT, was kicked off to further evaluate the solution options based on the agreed criteria. The considered solutions are the following:
1. Paging based option A: DL data transmitted in paging message;
2. Paging based option B: Radio Network Temporary Identity (RNTI) transmitted in paging message;
3. Paging based option C: DL grant scheduled in paging message;
4. Paging based option D: DL data scheduled in paging occasion;
5. DL data after preamble;
6. Msg4—A;
7. Msg4—B.

SUMMARY

Currently there exists some challenges. As discussed in the email discussion [104 #49][eMTC & NB-IoT R16] MT EDT, the first opportunity for transmission of MT DL data to the UE is in the paging message. This may incur a large waste of radio and core network resources in a cell and/or tracking area(s) since it requires transmission of DL data to a single UE with unnecessarily large paging load, in a cell and/or all cells that belong to the same tracking area(s). In addition, UEs that share the same paging occasion in a cell may need to decode the large paging message unnecessarily.

A slightly different version of the mechanism described above is to schedule the MT DL data in the paging message rather than providing the MT DL data in the paging message. This means a similar amount of resources would still be used, but the impact on the UE power consumption due to paging of other UEs would be less. Another version of the paging-based MT-EDT option is to schedule DL data rather than paging message in paging occasions.

The next opportunity for transmission of MT DL data is in Msg2. One possibility is to use the contention-free random access approach where a DL message (hereafter referred to as Msg2) is transmitted by the eNB in response to Msg1, which was previously transmitted using a contention-free preamble, see for example, the US Provisional application with Ser. No. 62/753,473, entitled "Reduced Signalling for Mobile-Terminated Early Data Transmission", filed on Nov. 1, 2018 at the USPTO.

In addition to the aforementioned, there are two other opportunities for MT-EDT. The Rel-15 MO-EDT UP- and CP-solutions can be used to develop MT UP- and CP-EDT solutions with minimal changes required, for example, as in the PCT application PCT/SE2018/051041, entitled "Mobile-Terminated Early Data Transmission" filed on Oct. 10, 2018 and in the provisional application having Ser. No. 62/735,626, entitled " Method for Mobile-Terminated Early Data Transmission", filed on Sept. 24, 2018 at the USPTO. In this approach, the DL user data are sent in Msg4 during the contention-based RA procedure.

In case MT-EDT is based on transmission of DL data before Msg4 (i.e., paging-based or in/with Msg2 or options 1-5 in the background section), a problem is foreseen with UE context handling in the UP MT-EDT solution. In particular, the eNB needs to be able to obtain the UE context in order to have Access Stratum (AS) security activated before the DL data transmission, whereas the UE needs to be able to reactivate its AS security so that it can decipher DL data in DL transmissions, both of which are intended to take place too early, at latest when the UE receives the DL data transmission in or scheduled by Msg2 (in options 1-5 in the background section) with respect to Msg3 during the legacy random access procedure.

In the legacy resume procedure, when a UE resumes to a new (i.e., target) eNB, the target eNB needs to obtain the UE context from the old (source) eNB, where the RRC connection was suspended from. This is done via the X2-AP retrieve UE context procedure. Upon reception of the resume request from the UE, the target eNB provides the source eNB with the resumeID and an authentication code, i.e., shortResumeMAC-I received from the RRCConnectionResumeRequest in Msg3. The source eNB locates the UE context using the resumeID and only provides the UE context if the authentication code is successfully verified. However, in case of MT-EDT with reduced signaling, such as in options 1-5 in the background section, the problem arises since the target eNB needs to obtain the UE context or part of the UE context needed for MT-EDT before it receives any identities or control signaling (e.g., RRC message) from the UE.

Therefore, it is desirable to have a solution for handling UE context so that the UP MT-EDT solution can be possible in the considered options 1-5 of the background section.

In this disclosure, a solution is proposed to allow for secure and reliable transmissions of MT-EDT DL data with reduced/minimal signaling required between the UE and the network. The solution is valid for LTE, NB-IoT, and is also applicable for Fifth Generation/New Radio (5G/NR).

More specifically, embodiments in this disclosure propose solutions for UE context handling to enable UP MT-EDT solution based on DL data before Msg4 in the RA procedure, i.e. paging-based or in/with Msg2 or options 1-5 in the background section.

According to one aspect, some embodiments include a method in a network node for early data transmission. The network node may be a target network node (for handover). The method comprises: sending a paging message to the wireless device, which has been suspended from a connection with a second network node, the paging message comprising an early data transmission (EDT) indication; receiving a random access preamble from the wireless device; obtaining context information of the wireless device; and resuming a data connection with the wireless device based on the context information.

According to another aspect, there is provided a method in a network node, such as a MME, for early data transmission. The method comprises: receiving one of an identifier related to a wireless device and context information of the wireless device, after the wireless device has been suspended from a second network node; sending one of the identifier and context information to a third network node, with which the wireless device is resuming the connection.

According to yet another aspect, there is provided a method in a network node, such as a source network node for early data transmission. The UE may be moving from the source network node to a target network node. The method comprises: suspending a connection with a wireless device; sending a message to a second network node, the message including one of an identifier related to the wireless device and context information of the wireless device.

According to yet another aspect, some embodiments include a network node (such as a base station/eNB or MME) configured, or operable, to perform one or more functionalities (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

The embodiments of the present disclosure make it possible the UP MT-EDT solution based on transmission of DL data in or scheduled with paging/Msg2 (i.e., MT-EDT options 1-5 in the introduction section).

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
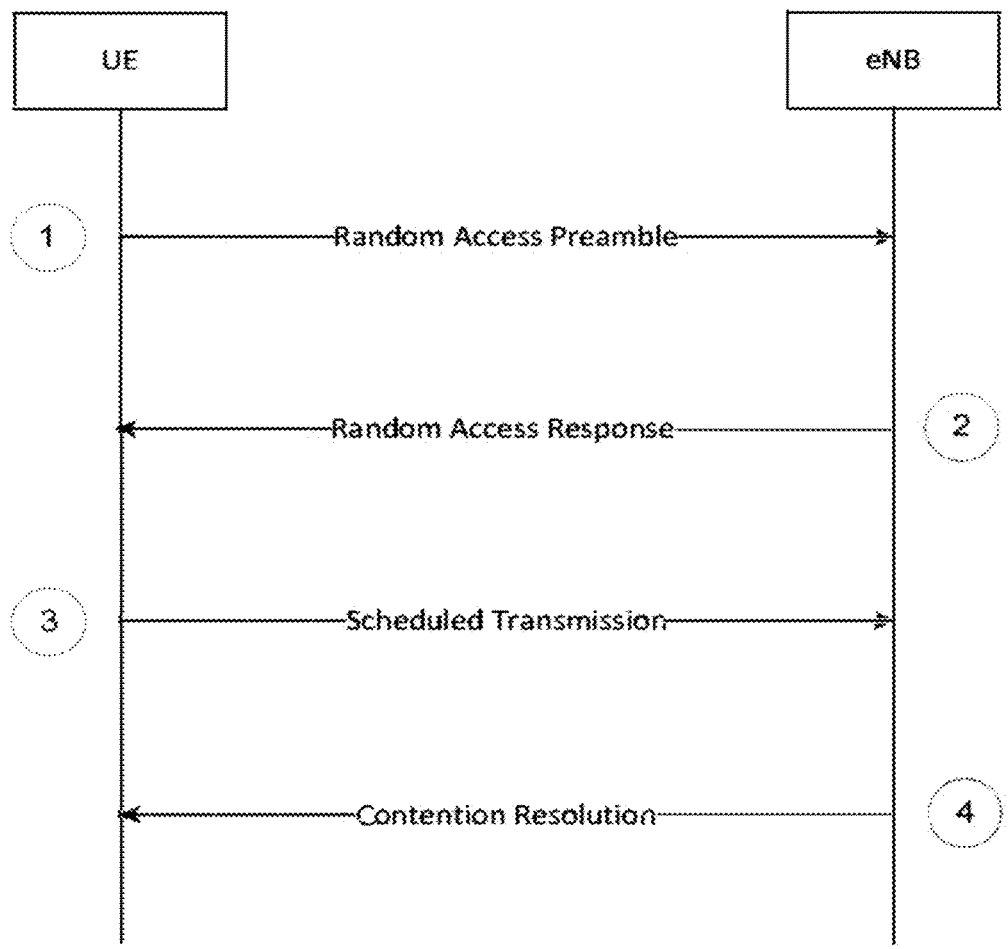
FIG. 1 illustrates a random access procedure.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments of the present disclosure provide several methods in a network node. Generally stated, the embodiments provide a method for a target (paging) eNB to perform the context fetch procedure directly from a source eNB, after a UE has suspended the connection with the source eNB, e.g. without the UE sending any security information to the target eNB. For example, this method comprises:

1) Context fetch based on an identifier for resuming a connection for the UE (e.g. resumeID) and security information based on which the source eNB can trust and provide the context information of the UE to the target eNB. Either the full UE context or part of the UE context needed for the UE and target eNB to perform the MT-EDT is exchanged/signaled during the context fetch procedure.

2) The source eNB can provide the resumeID and security information to a Mobility Management Entity (MME) during the suspension procedure of the UE. The MME will then forward the resume ID and security information to the target eNB during a S1 paging procedure. Or alternatively, the MME can request for this information from the source eNB, which will provide the information to the target eNB. Alternatively, the target eNB can request the context information from the MME which can provide the context information, if the MME has it. If the MME does not have the information, the MME can send a request to the source eNB for the context information to be sent to the target eNB.

3) As an alternative to the source eNB providing the resumeID and security information during the suspension procedure, the source eNB can include the resumeID and security information in a container to be uploaded and stored at the MME, which can be later provided to a (candidate) target eNB so that there is no need for exchange of context information between the source eNB and MME. In addition, there is also no need for the MME to comprehend or know the structure or details of the content of the information stored in the container. The information may comprise the full UE context or a partial UE context (e.g. part of the UE context).

As mentioned above, the exchange of context information can be the full UE context or a partial UE context (e.g. a part or subset of the UE context) needed for the MT-EDT. This partial UE context can be referred to as the MT-EDT context.

1) For example, in case of MT-EDT, there is no need for a full context fetch before the DL data transmission using MT-EDT. As such, the source eNB can provide a temporary UE context or partial UE context (i.e., MT-EDT UE context) to the MME, which will provide it to the target eNB for protection of DL data. Alternatively, the MME can retrieve this MT-EDT context from the source eNB at suspension. Alternatively, the MME can generate an MT-EDT context and provide it to the target eNB using, e.g., NAS security context information.

The actual/full/remaining aspects of the UE context can then be fetched after the DL data transmission, i.e., after/if the UE sends to the target eNB an UL RRC message in response to the DL data transmission, e.g., RRCConnectionResumeRequest in Msg3 with shortResumeMAC-I.

As another example, the context information fetch can be performed without using resumeID. For example, instead of using the resumeID, the UE context identification can be based on other existing identities, such as an identifier of the UE allocated by the source eNB (e.g. the eNB UE S1AP ID) and an identifier of the source eNB (e.g. eNB ID).

In this case, the MME provides to the target eNB, in the S1 paging message, the eNB UE S1 AP ID and eNB ID associated with the source eNB.
Then, the target eNB retrieves the UE context or information needed for the MT-EDT from the source eNB using the received eNB UE S1AP ID and eNB ID. The source eNB can link the eNB UE S1AP ID of the UE to the UE ID of the suspended UE and thus is able to locate the UE context information. The context information is then provided to the target eNB.

Furthermore, the MME may also provide security/authentication information (e.g., a token or signature) to the target eNB. The security/authentication information can be presented to and be validated by the source eNB to improve security. The source eNB may validate the authenticity of the request based on stored information, such as information retrieved from the MME or by querying the MME for validation. As non-limiting examples, the security/authentication information may have been generated, e.g., by the source eNB (and provided to the MME, e.g., at suspend time) or by the MME. The security/authentication information and/or validation may be further based on, e.g., symmetric or asymmetric cryptographic methods, AS or NAS security material, methods and/or algorithms.

A more detailed description of the embodiments will be provided hereinbelow.

It should be noted that in MT-EDT, in order to minimize overhead due to paging procedures and possibly the UE context fetch procedure, the MME always pages the UE in the most recent visited cells first.

Furthermore, the target eNB performs the context fetch or applies context/security information provided by the MME/source eNB for protection of DL data when necessary, i.e., as late as possible or just before the actual DL data transmission. In case of DL data after the preamble (option 5 in the background section), the target eNB waits until reception of the Physical Random Access Channel (PRACH), i.e. Contention-Free RA (CFRA) preamble, and then performs the context fetch or applies the security context to the DL data transmission. In this way, among a plurality of eNBs that paged the UE, only the target eNB that receives the CFRA PRACH transmission should obtain the UE context or security information needed for MT-EDT (see for examples FIGS. 2 to 4).

Figure 2:
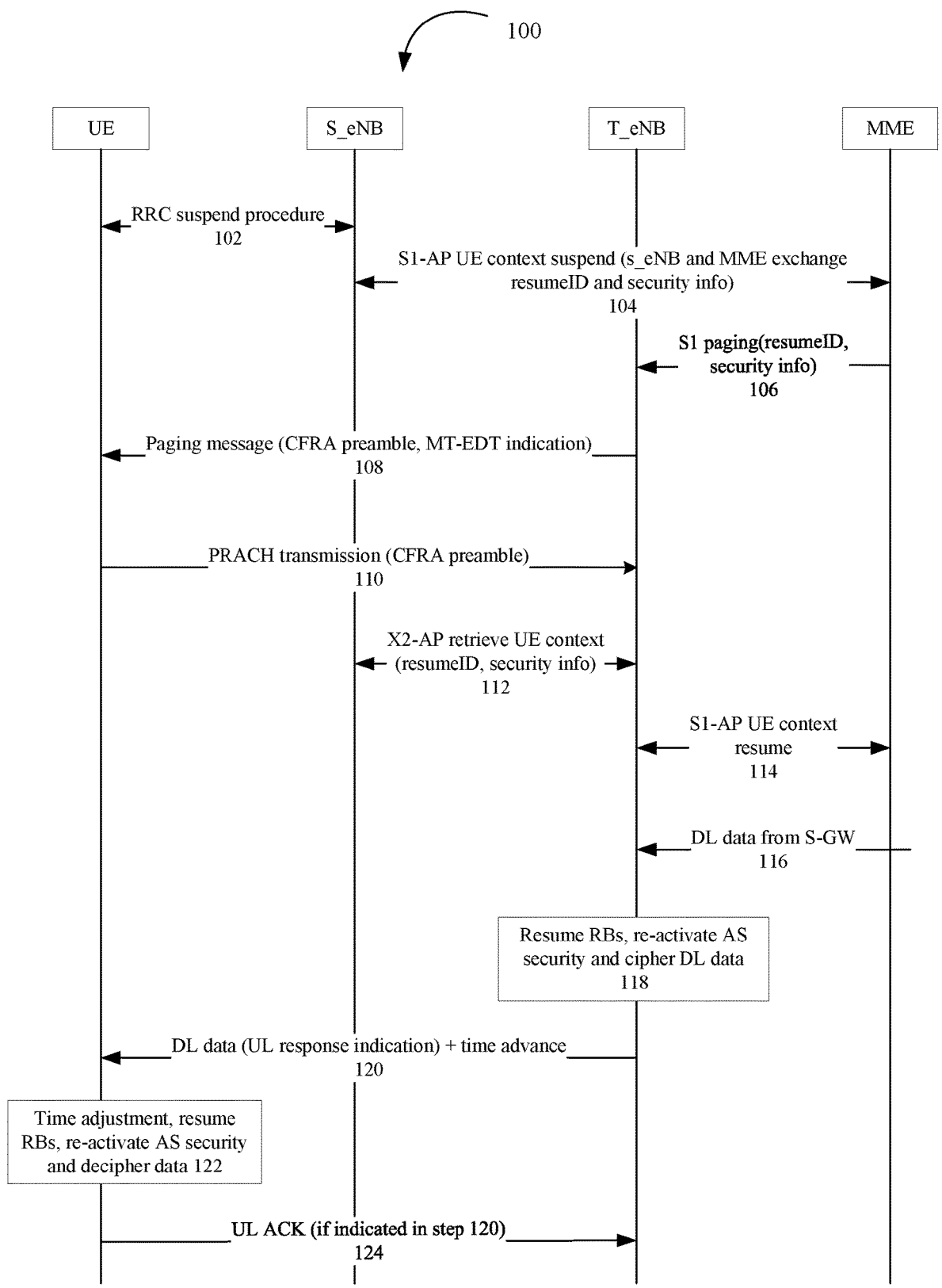
FIG. 2 illustrates a signalling flow for UE context handling in DL data after preamble MT-EDT with resumeID and security information exchanged between a source network node, a target network node and a MME, according to some embodiments.

Now, turning to FIG. 2, a signaling flow for obtaining context information for performing MT-EDT will be described.

Step 102: the UE and the source eNB (s_eNB) perform the RRC suspend procedure. During the suspend procedure, the s_eNB generates a resume identifier (resumeID) associated with the UE. The s_eNB can also generate some security information.

Step 104: the s_eNB provides the MME with the UE's resumeID in a message. The message can be a modified or new S1 message, such as a modified or new S1AP UE context suspend Request message. In addition to the resumeID, the s_eNB can also provide the MME with security information. The security information can be used to allow a target eNB to fetch the UE context from the source eNB. The security information can be similar to the shortResumeMAC-I in case of the legacy connection resume procedure. More specifically, the security information can be in the form of a security token, i.e., calculated using UE AS or NAS security context in a similar way as the shortResumeMAC-I of the connection resume procedure. The additional information (e.g. security information) can be included in the S1AP UE Context Suspend Request message with extension. Alternatively, a new S1AP procedure can be defined for this purpose. As an alternative, instead of the source eNB sending the resumeID and security information to the MME, the MME can retrieve the resumeID and the security information from the source eNB at suspension. In this case, a new S1 procedure can be defined to allow the MME to retrieve information about the UE from the source eNB. For example, after the legacy S1-AP UE context suspend procedure, the MME sends a message to the s_eNB to request for the resumeID and security information. As another example, the S1-AP UE context suspend response can be extended/modified to allow the MME to request the resumeID and optionally the security information. As another alternative, the source eNB can include the resumeID and context/security information in a container to be uploaded and stored at the MME, e.g., the local Radio Resource Management (RRM) policy at suspension. In this case, there is no need for the MME to comprehend or know the structure or details or content of the information uploaded/stored in the container. Step 106: the MME sends a paging message (e.g. S1 paging) to the target eNB, the paging message including the resumeID and security information corresponding to the UE being paged. The MME can determine that the paging is suitable for MT EDT (e.g., see US Provisional application with Ser. No. 62/754,473) and uses the paging message to trigger MT-EDT.

Step 108: upon receiving the S1 paging message from the MME (the S1 messaging indicating a MT-EDT), the target eNB (t_eNB) sends a paging message to the UE, the paging message including a CFRA preamble and a MT-EDT indication, for example. The paging message can include a CBRA preamble as well.

Step 110: In response to the paging message of step 108, the UE sends a PRACH transmission to the t_eNB, the PRACH transmission comprising the CFRA preamble received from the t_eNB. Step 112: At the target eNB, after receiving a message triggering MT-EDT from the MME, e.g., S1 paging message of step 106, if the UE was previously suspended from another eNB, the target eNB performs the context fetch procedure using the resumeID and security information received from the MME. Note that the target eNB can know/derive the ID of the source eNB from the resumeID. The UE context fetch procedure can be based on the existing X2 Retrieve UE context procedure, but this X2 retrieve UE context needs to be modified so that the target eNB, once it receives the S1 paging message from the MME, can retrieve the UE AS context and update the AS keys for the transmission of DL data to the UE. Alternatively, a new X2 procedure can be specified for this purpose. The information to be transferred during the context fetch procedure can be the whole/full UE context or a part of it which is necessary for performing the MT-EDT, for example. The latter is to avoid unnecessarily revealing too much UE context to multiple target eNBs before knowing which one is really in need of the context information for performing the MT-EDT.

As another example, instead of the target eNB fetching the context information directly from the source eNB, using the information provided by the MME, it is possible for the target eNB to actively request the MME to provide the context information needed for performing MT-EDT. This may happen in case, for example, the target eNB may not have security information to fetch the UE context information directly from the source eNB.

To do so, the target or paging eNB can request the MME to route the UE context to itself, using the resumeID or System Architecture Evolution (SAE)-Temporary Mobile Subscriber Identity (S-TMSI) or eNB UE S1AP ID and/or MME ID, which should be provided to the t_eNB in the S1 paging message (of step 106). In this case, the MME can use the S-TMSI or the combination of eNB UE S1AP ID and MME ID to identify which eNB the UE context is currently stored in. Once an eNB is identified as the source eNB, the MME sends a message to the source eNB to request the source eNB to forward the UE context information to the t_eNB. As an example, the MME sends a request for UE context retrieval to the source eNB. The MME also provides the mapping between the paging identifier (e.g., S-TMSI) and source eNB ID and eNB UE S1AP ID, which can be used by the source eNB to associate the UE context with the resumeID. In another example, the t_eNB may not need to ask the MME to route the UE context to the t_eNB. Instead, the MME, after it has decided on a MT-EDT paging procedure (step 106), can actively contact the source eNB and request it to forward the UE context to the t_eNB. A new S1 procedure can be defined to allow the MME to request the source eNB to forward the UE context to the target eNB, for example. The MME can request the UE context or only the MT-EDT context information needed for performing MT-EDT from the source eNB. The storing of the resumeID and context/security information in a container to be uploaded and stored at MME is also applicable in this example.

Step 114: After the context fetch procedure, the target eNB informs the MME about the resumption of the connection for the UE. The t_eNB sends a S1-AP UE context resume message to the MME, for example.

Step 116: The Serving Gateway (S-GW) forwards DL data to the t_eNB for DL transmission.

Step 118: Using the context information and the security information obtained in step 112, the target eNB re-activates the AS security and resumes the radio bearers, except for the Signaling Radio Bearer 0 (SRB0), for the UE. Alternatively, the t_eNB can resume/re-activate the radio bearers using the partial UE context/security context. Note that steps 114 and 118 can be performed in different orders, i.e., the t_eNB can resume the UE context before informing the MME about the resumption. Furthermore, the t_eNB can cipher the DL data using the activated AS security before sending the DL data for transmission.

Step 120: The t_eNB sends the ciphered DL data in a message to the UE. The message may further comprise a UL response indication (e.g. an acknowledgement feedback) and a time advance. As an alternative, the message can contain a scheduling indication of the DL data instead of the DL data themselves.

Step 122: At the UE, upon reception of the DL message from the target eNB, scheduling or containing DL data transmission, e.g., (M)PDCCH or PDSCH, the UE re-activates the AS security and resumes the radio bearers, except for SRB0. The UE then deciphers the DL data.

Step 124: If it was indicated in the message of step 120 that a UL response indication is necessary, then the UE sends a UL acknowledgement to the t_eNB.

Figure 3:
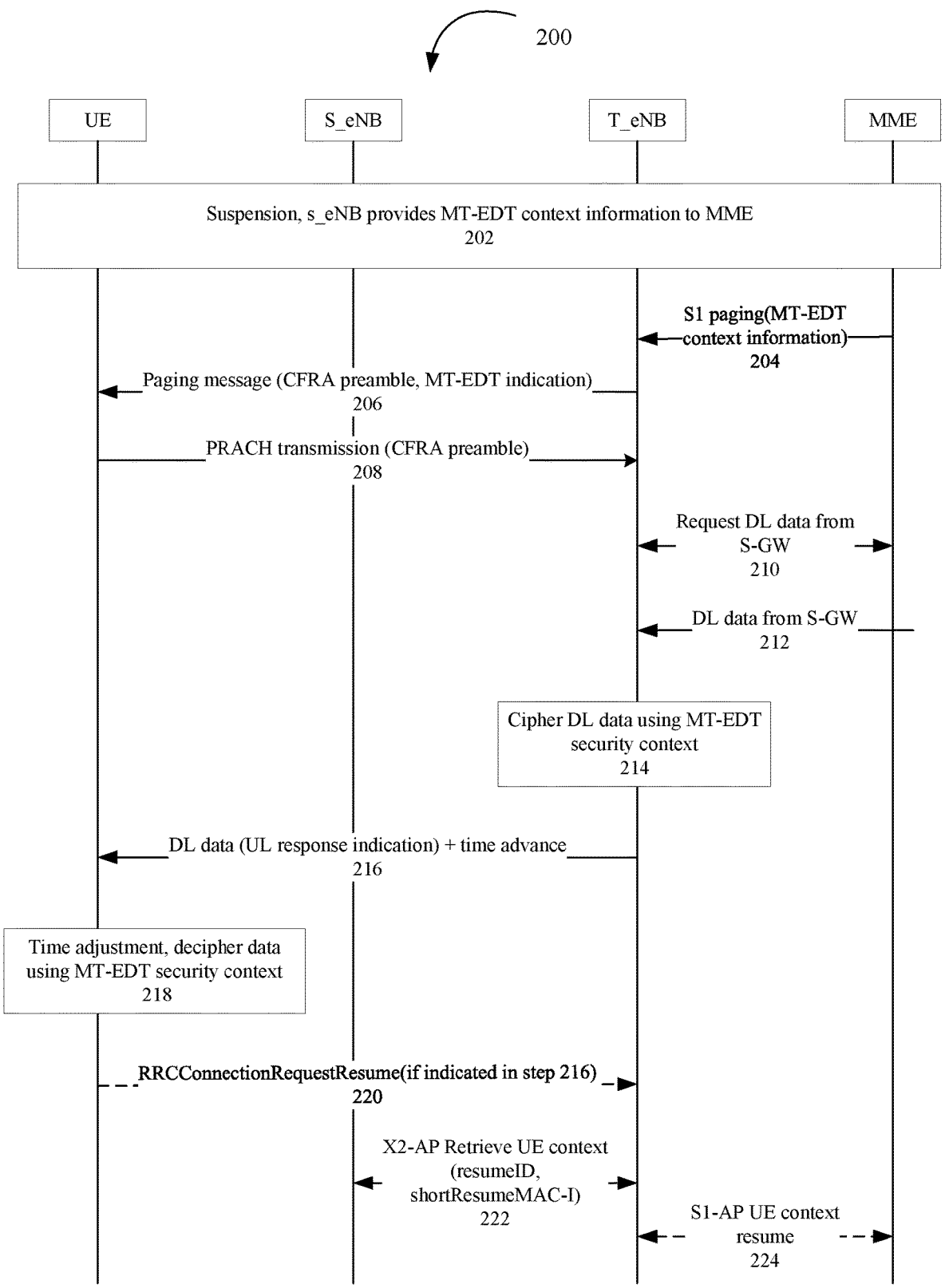
FIG. 3 is signaling flow for UE context handling in DL data after preamble MT-EDT using part of UE context, according to some embodiments.

It is possible to specify that the source eNB provides temporary context information to the MME, which can then provide the temporary context information to the target eNB for protection of DL data. As such, there is no need for a full context fetch before the DL data transmission. FIG. 3 shows an example of a signaling flow 200 illustrating this case. The signaling flow 200 can be described in steps as below:

Step 202: the UE is suspended from its connection with the source eNB. During the suspend procedure, the source eNB provides the MME with a temporary UE context or a part (or subset) of the UE context (or partial UE context, also referred to as the MT-EDT UE context) that is needed for performing MT-EDT, for example to allow the target eNB to protect MT-EDT DL data. This context information can comprise keys or security material, which can be used to protect DL data in the target eNB. It may comprise key(s) specific for MT-EDT, e.g., KeNB_MTEDT, K_RRCINT_MTEDT, K_RRCENC_MTEDT and/or K_UPENC_MTEDT. Key(s) specific to MT-EDT may be derived from, e.g., KeNB, KeNB*, NH, K_RRCINT, K_RRCENC and/or K_UPENC. The MT-EDT context can be temporary security context, but it should not comprise or reveal KeNB and/or KeNB* and/or NH to avoid unnecessarily revealing AS context information to multiple eNBs before any authentication mechanism. The derivation function of key(s) specific to MT-EDT may be designed with freshness, count, or start value parameter and cell or eNB ID in the input, which could be signaled in the suspend procedure, if needed. In this case, it should be specified that the UE can perform the same procedure to derive/obtain MT-EDT context information for deciphering DL data as well as ciphering possible UL data. As an example, the MT-EDT UE context information can be included in the S1AP UE Context Suspend Request message (from s_eNB to MME). As such, the S1AP UE Context Suspend Request message is modified or extended to add the MT-EDT UE context information. Alternatively, a new S1AP procedure can be defined for sending the MT-EDT UE context information from the s_eNB to the MME. However, the MME can request it from the source eNB at suspension. In this case, a new S1 procedure can be defined to allow the MME to retrieve information about the UE context from the source eNB at the suspension, e.g., after the S1-AP UE context suspend procedure. Alternatively, the S1-AP UE context suspend response can be extended to allow the MME to request for the MT-EDT UE context information. The MME can include the MT-EDT UE context information in the S1 paging message to the target eNB (see step 204). As such, there is no need for the target eNB to perform a context fetch procedure before the DL data transmission. Instead, the target eNB can directly apply the MT-EDT UE context information for performing a DL transmission comprising DL data.

Step 204: During the S1 paging procedure, once the MME determines that the paging is suitable for MT EDT (e.g., see U.S. provisional application having Ser. No. 62/753,473), it sends to the target eNB a S1 paging message, the S1 paging message including the MT-EDT UE context information corresponding to the UE being paged.

Step 206: upon receiving the S1 paging message from the MME (the S1 messaging indicating a MT-EDT and containing MT-EDT context information), the target eNB (t_eNB) sends a paging message to the UE, the paging message including a CFRA preamble and a MT-EDT indication, for example. The paging message can include a CBRA preamble as well.

Step 208: in response to the paging message of step 206, the UE sends a PRACH transmission to the t_eNB, the PRACH transmission comprising a CFRA preamble.

Step 210: the t_eNB sends a request to the MME to request for DL data from the S-GW.

Step 212: the S-GW sends DL data to the t_eNB.

Step 214: the t_eNB ciphers the DL data using the MT-EDT context information, such as security context information. For example, the target eNB, after receiving the message (e.g., S1 paging message) triggering MT-EDT from the MME (step 204), if the UE was previously suspended from another eNB (i.e. s_eNB), prepares the DL transmission comprising DL data based on a default configuration. For example, the DL data are protected using security information provided by the MT-EDT UE context. Optionally, the source eNB can upload the UE AS configuration together with the security information to the MME during the suspend procedure (step 202) and the MME then provides this to the target eNB (step 204) to be used instead of the default configuration. The actual UE context can then be fetched and updated after the UE has sent to the target eNB an RRC message in response to the DL data transmission, e.g., Msg3, with a security token, e.g., shortResumeMAC-I (see steps 220 to 224 in FIG. 3). As another alternative to using the MT-EDT UE context information uploaded from the source eNB to the MME and then being provided to the target eNB for protection of the DL data, the MME can generate the context/security information using, e.g., NAS security context, and then send the context/security information to the eNB (see step 204).

Step 216: the t_eNB sends a message containing the DL data to the UE. The message may also comprise a UL response indication/feedback and a time advance.

Step 218: At the UE side, it should be specified that the UE can analogously/correspondingly derive the MT-EDT context for data protection. After reception of the DL message from the target eNB, the message scheduling or containing the DL data transmission, the UE deciphers the DL data using the derived/stored context. In case of UL transmissions, in response to DL data, the UE reactivates the AS security and resumes radio bearers as in Rel-15 MO UP-EDT.

Step 220: the UE sends a message, such as RRCConnectionResumeRequest, to the t_eNB, for requesting to establish/resume a connection with the t_eNB. In this message, the UE can also provide a security token, e.g., shortResumeMAC-I, and the resumeID.

Step 222: based on the received security token and resumeID, the t_eNB performs the UE context fetch procedure with the s_eNB in order to retrieve the actual full UE context.

Step 224: once the t_eNB has retrieved the UE context, it sends a message to the MME to indicate that the connection has been resumed.

Figure 4:
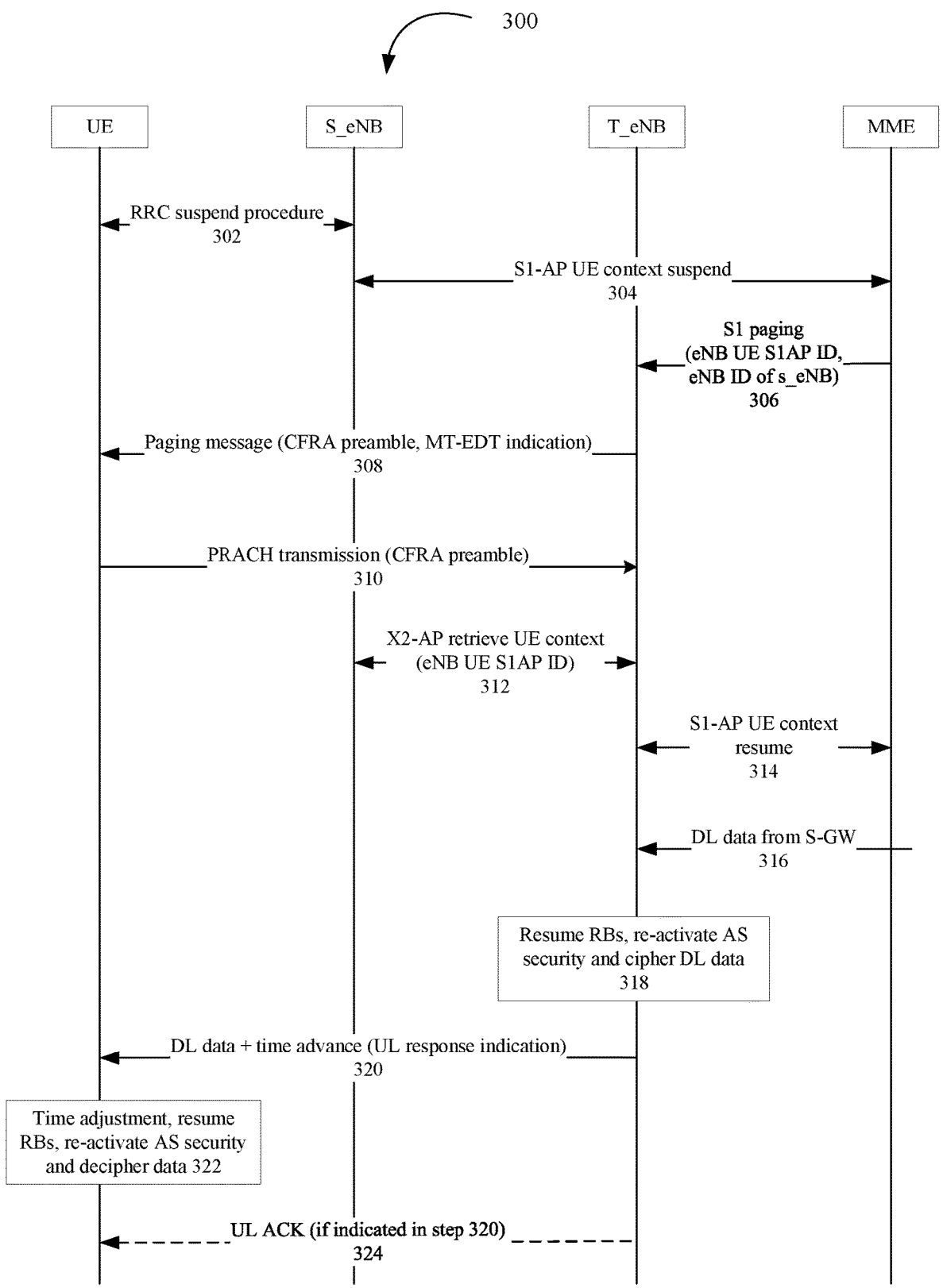
FIG. 4 illustrates a signaling flow for UE context handling in MT-EDT without using resumeID, according to some embodiments.

FIG. 4 illustrates a signaling flow for handling MT-EDT in which the UE context fetch procedure is performed without the resumeID.

Indeed, as an alternative to the context fetch procedure, based on the resumeID, it is possible that the source eNB does not need to provide the resumeID/context to the MME at suspension, in order to avoid unnecessary context fetch later on. Instead, context identification can be based on an exchange of existing identities between the source eNB, MME and target eNB. The method comprises:

Step 302: the UE and the s_eNB perform the suspend procedure.

Step 304: the s_eNB and MME perform the legacy suspend procedure (e.g. S1-AP UE context suspend).

Step 306: the MME sends a S1 paging message to the t_eNB. The S1 message may comprise an identifier of the UE (e.g. eNB UE S1AP ID) which has been assigned by the s_eNB to the UE, an identifier of the s_eNB (eNB ID) and possibly also an identifier of the MME (e.g. MME ID). The MME may also provide security/authentication information (e.g., a token or signature) to the target eNB. The security/authentication information can be later presented to and be validated by the source eNB to improve security. The source eNB may validate the authenticity of the request based on stored information or based on information retrieved from the MME or by querying the MME for validation. As non-excluding examples, security/authentication information may have been generated, e.g., by the source eNB (and provided to the MME, e.g., at suspend time) or by the MME. As further non-excluding examples, security/authentication information and/or validation may be based on, e.g., symmetric or asymmetric cryptographic methods, AS or NAS security material, methods and/or algorithms Steps 308 to 310 are the same as steps 108 to 110.

Step 312: in this step, the UE context or information needed from the UE context for performing the MT-EDT can be obtained without relying on the conventional way of identifying the context information based on the resumeID. Instead, in step 312, the UE context can be identified using the eNB UE S1AP ID. To do so, upon reception of the S1 paging message (step 306), the target eNB retrieves the UE context/information needed for MT-EDT from the source eNB using the received eNB UE S1AP ID, eNB ID of source eNB, and, if applicable, MME ID. The source eNB can link the eNB UE S1AP ID of the UE to the UE ID and is able to locate the UE context, which is then provided to the target eNB.

Steps 314 to 324 are similar to steps 114 to 124.

It should be noted that the variations to fetch the context information directly between the t_eNB and s_eNB, or the t_eNB requesting the context information from the MME apply in this Figure as well. Furthermore, the context information can be the full UE context or a part (subset) of the UE context.

In order to simplify the process of identifying network entities, an eNB can allocate a resumeID partially based on the eNB UE S1AP ID and eNB ID. For example, the UE part of the resumeID can be the same as the eNB UE S1AP ID or a part thereof and the eNB part of the resumeID can be eNB ID or a part thereof.

It should be appreciated that what has been described above in an Evolved Packet System (EPS) context and in terms of identifiers, interfaces, nodes, etc., in EPS can be applied also in a Fifth Generation System (5GS) or mixed EPS-5GS context and in terms of (corresponding) identifiers, interfaces, nodes, etc. associated with 5GS or mixed EPS-5GS.

Figure 5:
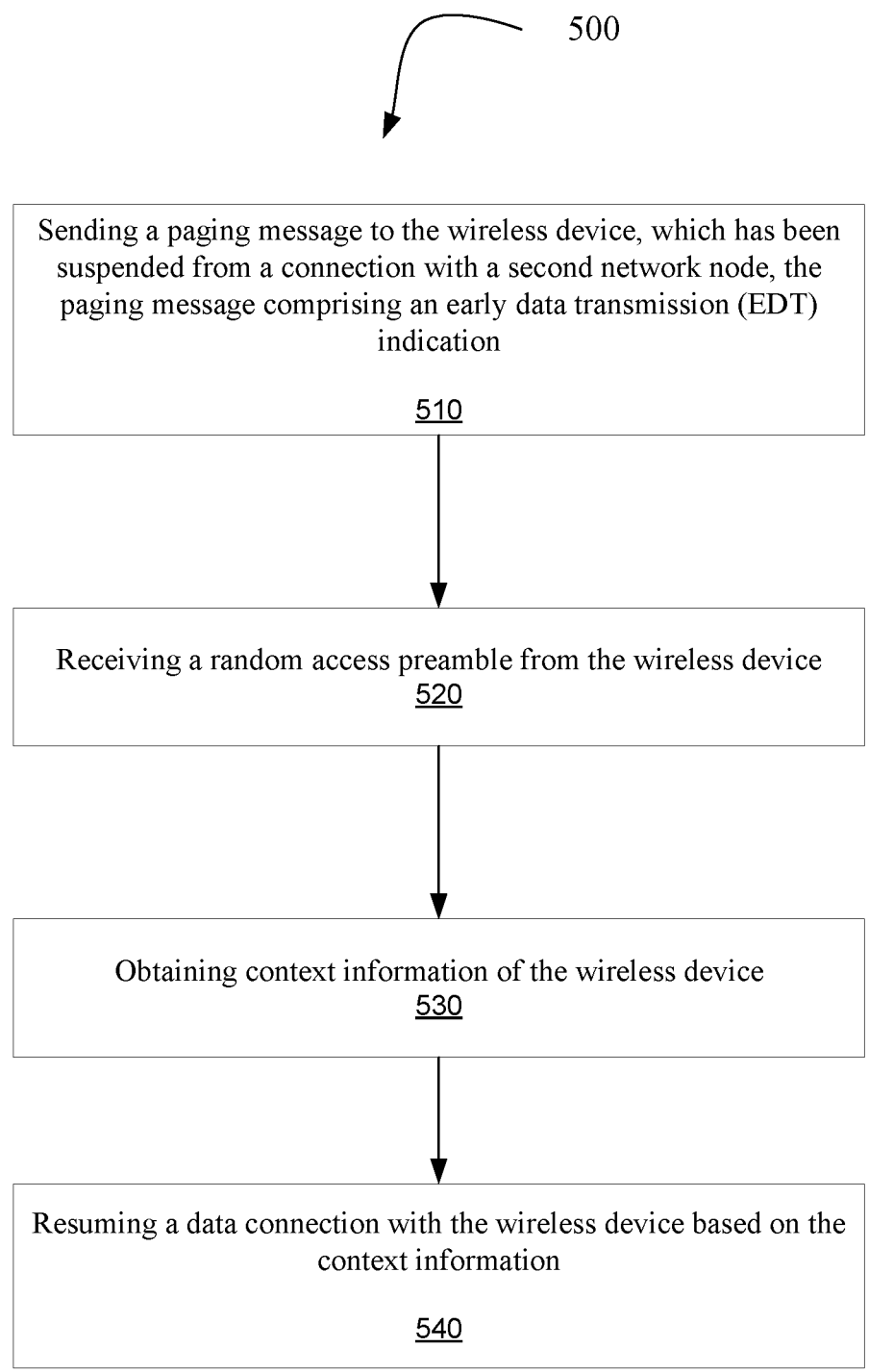
FIG. 5 is a flow chart of a method in a network node, in accordance with some embodiments.

Now turning to FIG. 5, a method 500 in a first network node performing secure Mobile Terminated (MT) early data transmission (EDT) will be described. The MT EST may occur before the fourth message (Msg4) in a random access procedure, for example. The network node may be a target network node. The method 500 comprises:

Step 510: sending a paging message to the wireless device, which has been suspended from a connection with a second network node, the paging message comprising an early data transmission (EDT) indication.

Step 520: receiving a random access preamble from the wireless device.

Step 530: obtaining context information of the wireless device.

Step 540: resuming a data connection with the wireless device based on the context information.

In some examples, the method can obtain the context information by: receiving, from a third network node, an identifier related to the wireless device; sending a request for the context information to the second network node, the request comprising the identifier; and in response to the request, receiving the context information from the second network node.

In some examples, the identifier can be a resume identifier for resuming a connection or an identifier of the wireless device allocated by the second network node. For example, the identifier of the wireless device allocated by the second network node can be an eNB UE S1AP ID.

In some examples, the method can obtain the context information by receiving the context information from the third network node in a paging message.

In some examples, the method may further obtain security information. For example, the security information can comprise temporary security context information.

In some examples, the context information may be a full UE context, partial UE context or temporary context (or Mt-EDT context).

In some examples, the second network node may be a source network node.

In some examples, the third network node may be a Mobility Management entity (MME).

Figure 6:
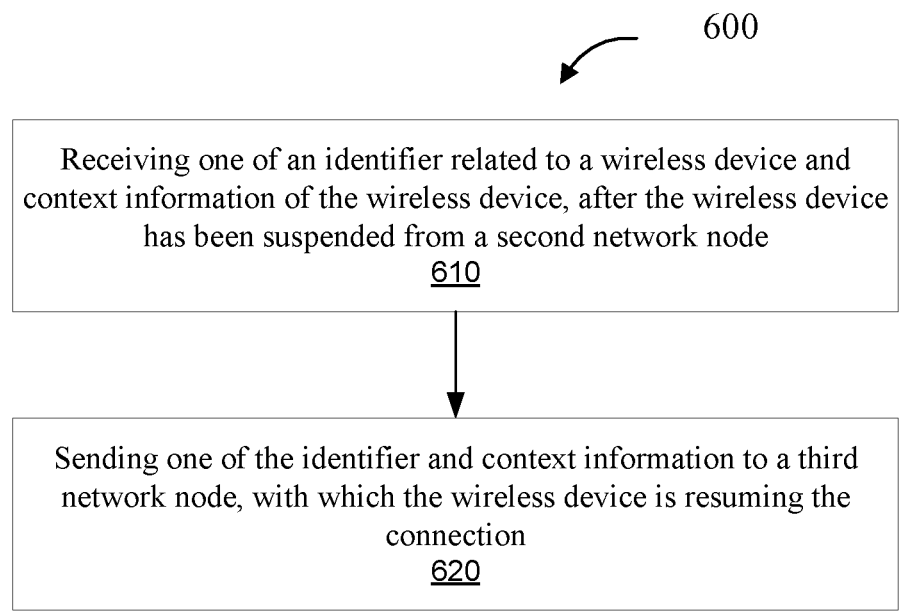
FIG. 6 is a flow chart of a method in another network node, in accordance with some embodiments.

FIG. 6 illustrates a method 600 in a first network node for performing secure Mobile Terminated (MT) early data transmission (EDT). The MT EDT may occur before a fourth message (Msg4) in a random access procedure, for example. The first network node may be the MME, for example. The method 600 comprises:

610: receiving one of an identifier related to a wireless device and context information of the wireless device, after the wireless device has been suspended from a second network node.

620: sending one of the identifier and context information to a third network node, with which the wireless device is resuming the connection.

In some examples, the method may receive the identifier or context information by fetching the identifier or the context information from a container uploaded to the first network node by the second network node. The second network node may be the source network node.

In some examples, the identifier may be a resume identifier or an identifier of the wireless device allocated by the second network node.

In some examples, the method may receive a message indicating that the wireless device has resumed a connection with the third network node based on context information of the wireless device obtained based on the identifier. The third network node may be the target network node.

In some examples, the method may receive a request for downlink data transmissions.

In some examples, the context information may be one of a full UE context, partial UE context and temporary UE context.

In some examples, the method may receive security information from the second network node.

Figure 7:
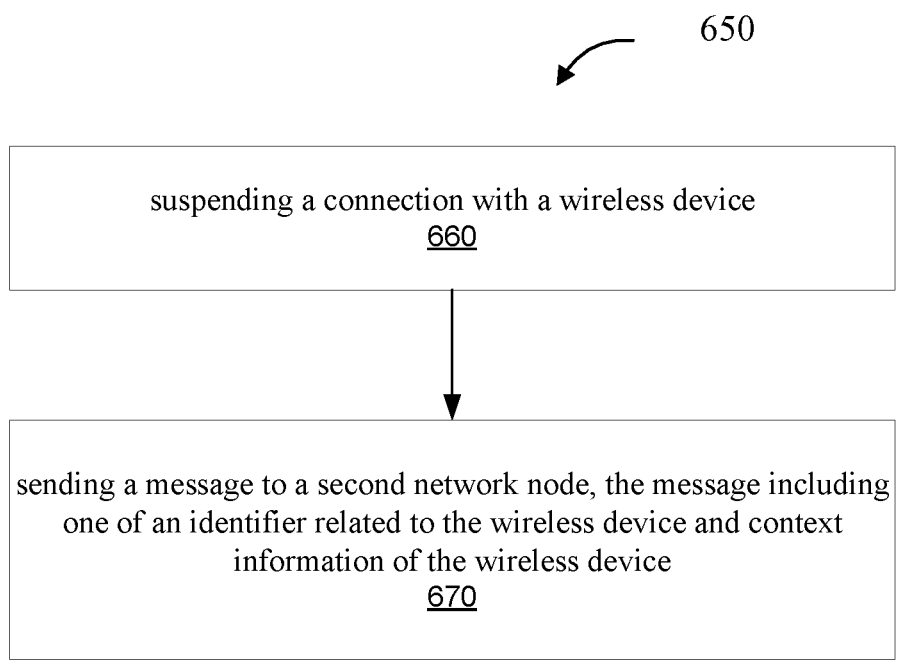
FIG. 7 is a flow chart of a method in another network node, in accordance with some embodiments.

FIG. 7 illustrates a method 650 in a first network node for performing secure Mobile Terminated (MT) early data transmission (EDT). The MT EDT may occur before a fourth message (Msg4) in a random access procedure, for example. The first network node may be the source network node, for example. The method 650 comprises:

Step 660: suspending a connection with a wireless device

Step 670: sending a message to a second network node, the message including one of an identifier related to the wireless device and context information of the wireless device. The second network node may be the MME.

In some examples, the method 650 may receive, from a third network node, a request for context information based on the identifier. The third network node may be the target network node.

In some examples, the method 650 may send the context information to the third network node.

In some examples, the context information may be a full UE context, partial UE context and temporary UE context.

In some examples, the method may receive security information from the second network node.

The above embodiments allow for secure early transmissions of MT DL data using a MT-EDT method with reduced signaling, i.e., MT DL data before Msg4 in the RA procedure. They also solve the problem of how to improve security for Rel-16 MT-EDT with DL data transmission in or scheduled with paging message or with Msg2 in contention-free random access procedure. This is in context of CP and UP MT-EDT being considered for LTE, NB-IoT, and 5G/NR.

Figure 8:
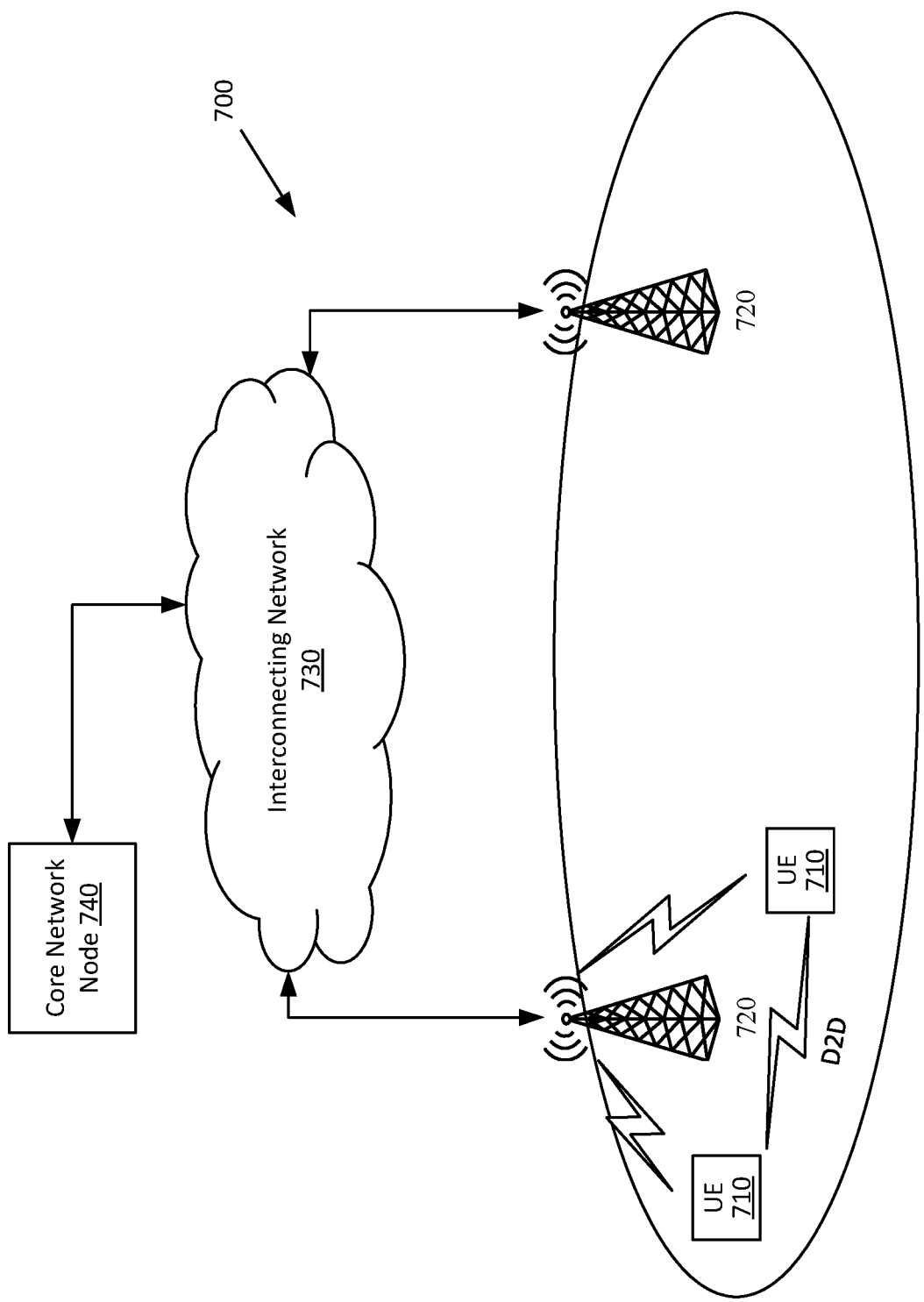
FIG. 8 illustrates one example of a wireless communications system in which embodiments of the present disclosure may be implemented.

FIG. 8 illustrates an example of a wireless network 700 that may be used for wireless communications. Wireless network 700 includes UEs 710 and a plurality of radio network nodes 720 (e.g., Node Bs (NBs) Radio Network Controllers (RNCs), evolved NBs (eNBs), next generation NB (gNBs), etc.) directly or indirectly connected to a core network 740 which may comprise various core network nodes. The network 700 may use any suitable radio access network (RAN) deployment scenarios, including Universal Mobile Telecommunication System (UNITS) Terrestrial Radio Access Network (UTRAN), and Evolved UNITS Terrestrial Radio Access Network (EUTRAN). UEs 710 may be capable of communicating directly with radio network nodes 720 over a wireless interface. In certain embodiments, UEs may also be capable of communicating with each other via device-to-device (D2D) communication. In certain embodiments, network nodes 720 may also be capable of communicating with each other, e.g. via an interface (e.g. X2 in LTE or other suitable interface).

As an example, UE 710 may communicate with radio network node 720 over a wireless interface. That is, UE 710 may transmit wireless signals to and/or receive wireless signals from radio network node 720. The wireless signals may contain voice traffic, data traffic, control signals, and/or any other suitable information. In some embodiments, an area of wireless signal coverage associated with a radio network node 720 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc. Example embodiments of a wireless device 710 are described in more detail below with respect to FIG. 9.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 720 may interface with a radio network controller (not shown). The radio network controller may control network nodes 720 and may provide certain radio resource management functions, mobility management functions, and/or other suitable functions. In certain embodiments, the functions of the radio network controller may be included in the network node 720. The radio network controller may interface with the core network node 740. In certain embodiments, the radio network controller may interface with the core network node 740 via the interconnecting network 730.

The interconnecting network 730 may refer to any interconnecting system capable of transmitting audio, video, signals, data, messages, or any combination of the preceding. The interconnecting network 730 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 740 may manage the establishment of communication sessions and various other functionalities for wireless devices 710. Examples of core network node 740 may include MSC, MME, SGW, PGW, O&M, OSS, SON, positioning node (e.g. E-SMLC), MDT node, etc. Wireless devices 110 may exchange certain signals with the core network node 740 using the non-access stratum layer. In non-access stratum signaling, signals between wireless devices 710 and the core network node 740 may be transparently passed through the radio access network. In certain embodiments, network nodes 720 may interface with one or more other network nodes over an internode interface. For example, network nodes 720 may interface each other over an X2 interface.

Although FIG. 8 illustrates a particular arrangement of network 700, the present disclosure contemplates that the various embodiments described herein may be applied to a variety of networks having any suitable configuration. For example, network 700 may include any suitable number of wireless devices 710 and network nodes 720, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, L FDD/TDD, etc.

The communication system 700 may itself be connected to a host computer (not shown), which may be embodied in the hardware and/or software of a standalone server, a cloud-implemented server, a distributed server or as processing resources in a server farm. The host computer may be under the ownership or control of a service provider, or may be operated by the service provider or on behalf of the service provider. The connections between the communication system 700 and the host computer may extend directly from the core network 740 to the host computer or may extend via the intermediate network 730.

The communication system of FIG. 8 as a whole enables connectivity between one of the connected wireless devices (WDs) 710 and the host computer. The connectivity may be described as an over-the-top (OTT) connection. The host computer and the connected WDs 710 are configured to communicate data and/or signaling via the OTT connection, using an access network, the core network 740, any intermediate network 730 and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 710 connecting via an OTT connection terminating at the WD 710 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 720 and or the wireless device 710.

One or more of the various embodiments in this disclosure improve the performance of OTT services provided to the WD 710 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

Figure 9:
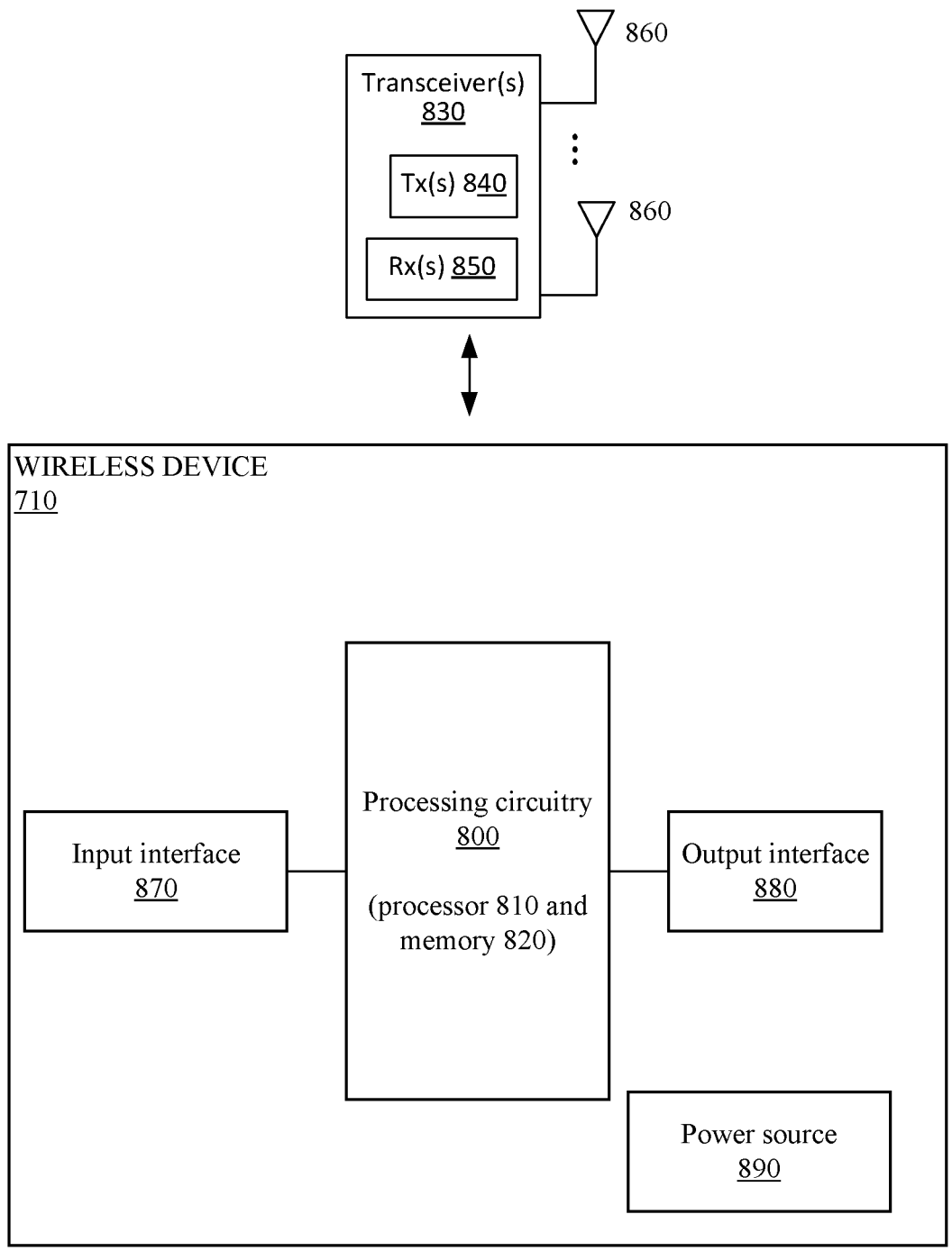
FIG. 9 is a block diagram that illustrate a wireless device according to some embodiments of the present disclosure.

FIG. 9 is a schematic block diagram of the wireless device 710 according to some embodiments of the present disclosure. As illustrated, the wireless device 710 includes circuitry 800 comprising one or more processors 810, e.g., Central Processing Units (CPUs), Application Specific Integrated Circuits (ASICs), Field Programmable Gate Arrays (FPGAs), and/or the like) and memory 820. The wireless device 710 also includes one or more transceivers 830 that each include one or more transmitters 840 and one or more receivers 850 coupled to one or more antennas 860. The wireless device 710 may also comprise a network interface and more specifically an input interface 870 and an output interface 880 for communicating with other nodes. The wireless device may also comprise a power source 890.

In some embodiments, the functionality of the wireless device 710 described above may be fully or partially implemented in software that is, e.g., stored in the memory 820 and executed by the processor(s) 810. For example, the processor 810 is configured to perform any of the functionalities of the wireless device 710.

In some embodiments, a computer program including instructions which, when executed by the at least one processor 810, causes the at least one processor 810 to carry out the functionality of the wireless device 710 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
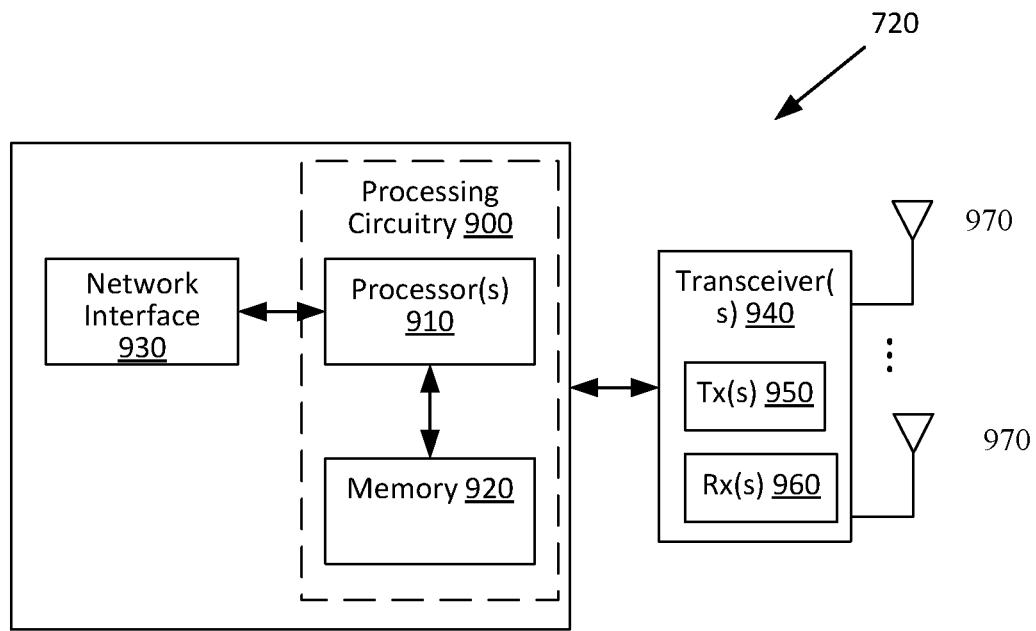
FIGS. 10 and 11 are block diagrams that illustrate a network node according to some embodiments of the present disclosure.

FIG. 10 is a schematic block diagram of a network node 720 according to some embodiments of the present disclosure. As illustrated, the network node 720 includes a processing circuitry 900 comprising one or more processors 910 (e.g., CPUs, ASICs, FPGAs, and/or the like) and memory 920. The network node also comprises a network interface 930. The network node 720 also includes one or more transceivers 940 that each include one or more transmitters 950 and one or more receivers 960 coupled to one or more antennas 970. In some embodiments, the functionality of the network node 720 described above may be fully or partially implemented in software that is, e.g., stored in the memory 920 and executed by the processor(s) 910. For example, the processor 910 can be configured to perform the method 500 of FIG. 5, method 600 of FIG. 6 and method 650 of FIG. 7, when the network node 720 is a target network node, MME and source network node respectively.

Figure 11:
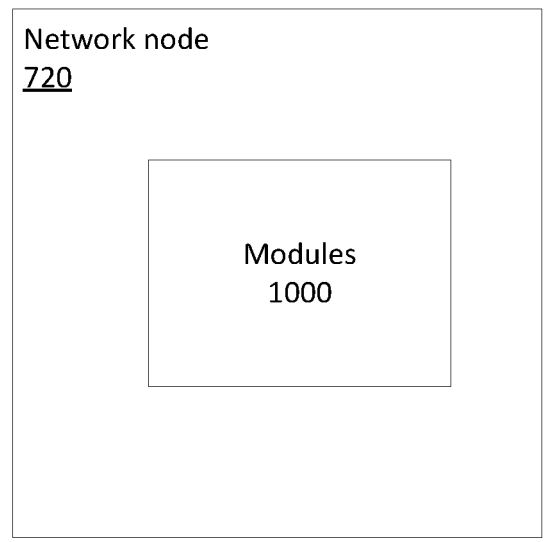

FIG. 11 is a schematic block diagram of the network node 720 according to some other embodiments of the present disclosure. The network node 720 includes one or more modules 1000, each of which is implemented in software. The module(s) 1000 provide the functionality of the network node 720 described herein. The module(s) 1000 may comprise, for example, a sending module operable to perform step 510 of FIG. 5, step 620 of FIG. 6 and step 670 of FIG. 7. The module(s) 1000 may comprise a receiving module operable to perform step 520 of FIG. 5 and step 610 of FIG. 6. The module(s) 1000 may comprise an obtaining module operable to perform step 530 of FIG. 5, a resuming module operable to perform step 540 of FIG. 5 and a suspending module operable to perform step 660 of FIG. 7.

Figure 12:
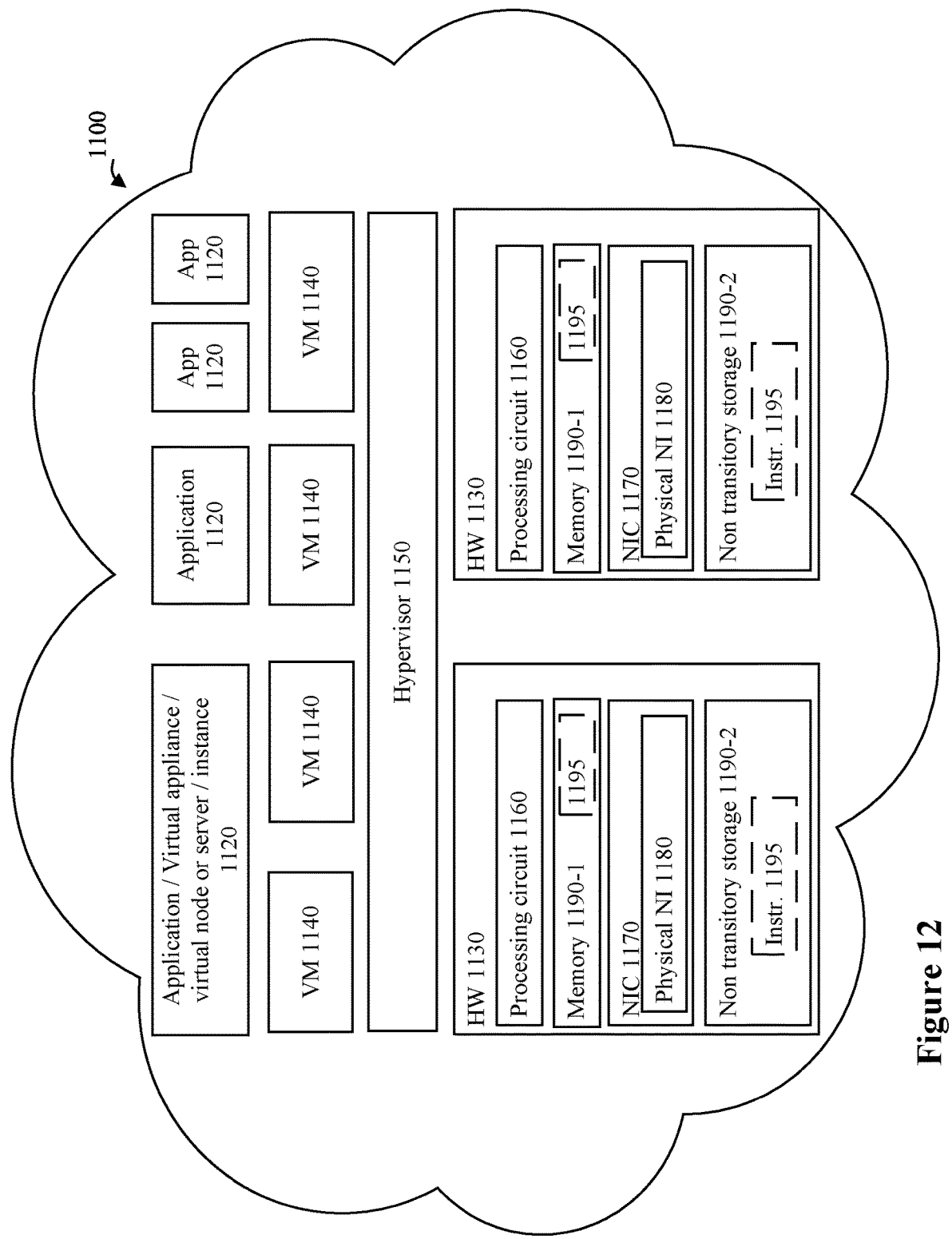
FIG. 12 illustrates a virtualized environment of a network node, according to some embodiments of the present disclosure.

FIG. 12 is a schematic block diagram that illustrates a virtualized embodiment of the wireless device 710 or network node 720, according to some embodiments of the present disclosure. As used herein, a "virtualized" node 1100 is a network node 720 or wireless device 710 in which at least a portion of the functionality of the network node 720 or wireless device 710 is implemented as a virtual component (e.g., via a virtual machine(s) executing on a physical processing node(s) in a network(s)). For example, in FIG. 11, there is provided an instance or a virtual appliance 1120 implementing the methods or parts of the methods of some embodiments. The one or more instance(s) runs in a cloud computing environment 1100. The cloud computing environment provides processing circuits 1130 and memory 1190-1 for the one or more instance(s) or virtual applications 1120. The memory 1190-1 contains instructions 1195 executable by the processing circuit 1160 whereby the instance 1120 is operative to execute the methods or part of the methods described herein in relation to some embodiments.

The cloud computing environment 1100 comprises one or more general-purpose network devices including hardware 1130 comprising a set of one or more processor(s) or processing circuits 1160, which may be commercial off-the-shelf (COTS) processors, dedicated Application Specific Integrated Circuits (ASICs), or any other type of processing circuit including digital or analog hardware components or special purpose processors, and network interface controller(s) (NICs) 1170, also known as network interface cards, which include physical Network Interface 1180. The general-purpose network device also includes non-transitory machine readable storage media 1190-2 having stored therein software and/or instructions 1195 executable by the processor 1160. During operation, the processor(s)/processing circuits 1160 execute the software/instructions 1195 to instantiate a hypervisor 1150, sometimes referred to as a virtual machine monitor (VMM), and one or more virtual machines 1140 that are run by the hypervisor 1150.

A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine 1140, be it hardware 1130 dedicated to that virtual machine 1140 and/or time slices of hardware 1130 temporally shared by that virtual machine 1140 with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1120 may be implemented on one or more of the virtual machine(s) 1140, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method in a first network node for performing secure Mobile Terminated (MT) early data transmission (EDT), the method comprising:
    sending a paging message to a wireless device, which has been suspended from a connection with a second network node, the paging message comprising an early data transmission (EDT) indication;
    receiving a random access preamble from the wireless device;
    obtaining, from the second network node, context information of the wireless device, wherein obtaining the context information comprises receiving, from a third network node, an identifier related to the wireless device, and wherein the identifier is received by fetching the identifier from a container uploaded to the first network node by the second network node; and
    resuming a data connection with the wireless device based on the context information.

2. The method of claim 1, wherein obtaining the context information further comprises:
    sending a request for the context information to the second network node, the request comprising the identifier; and
    in response to the request, receiving the context information from the second network node.

3. The method of claim 2, wherein the identifier is one of a resume identifier for resuming a connection and an identifier of the wireless device allocated by the second network node.

4. The method of claim 3, wherein the identifier of the wireless device allocated by the second network node is an eNB UE S1AP ID.

5. The method of claim 1, wherein obtaining the context information comprises receiving the context information from the third network node in a paging message.

6. The method of claim 1, wherein obtaining the context information further comprises obtaining security information.

7. The method of claim 6, wherein the security information comprises temporary security context information.

8. The method of claim 1, wherein the context information comprises one of full User Equipment (UE) context, partial UE context and temporary context.

9. The method of claim 1, wherein the second network node is a source network node.

10. The method of claim 1, wherein the third network node is a Mobility Management entity (MME).

11. A first network node for performing secure Mobile Terminated (MT) early data transmission (EDT), the first network node comprising:
    a communication interface; and
    processing circuitry connected to the communication interface, wherein the processing circuitry comprises a memory and a processor connected thereto, the memory containing instructions that, when executed, cause the processor to:
        send a paging message to a wireless device, which has been suspended from a connection with a second network node, the paging message comprising an early data transmission (EDT) indication;
        receive a random access preamble from the wireless device;
        obtain, from the second network node, context information of the wireless device; and
        resume a data connection with the wireless device based on the context information,
        wherein the processor is configured to obtain the context information by receiving, from a third network node, an identifier related to the wireless device, and wherein the identifier is received by fetching the identifier from a container uploaded to the first network node by the second network node.

12. The first network node of claim 11, wherein the processor is further configured to obtain the context information by:
    sending a request for the context information to the second network node, the request comprising the identifier; and
    in response to the request, receiving the context information from the second network node.

13. The first network node of claim 12, wherein the identifier is one of a resume identifier for resuming a connection and an identifier of the wireless device allocated by the second network node.

14. The first network node of claim 13, wherein the identifier of the wireless device allocated by the second network node is an eNB UE S1AP ID.

15. The first network node of claim 11, wherein the processor is configured to obtain the context information by receiving the context information from a third network node in a paging message.

16. The first network node of claim 11, wherein the processor is further configured to obtain security information.

17. The first network node of claim 16, wherein the security information comprises temporary security context information.

18. The first network node of claim 11, wherein the context information comprises one of full UE context, partial UE context and temporary context.

19. The first network node of claim 11, wherein the second network node is a source network node.

20. The first network node of claim 11, wherein the third network node is a Mobility Management entity (MME).

* * * * *